US008042047B2

(12) United States Patent
Davis et al.

(10) Patent No.: US 8,042,047 B2
(45) Date of Patent: Oct. 18, 2011

(54) INTERACTIVE PROMOTIONAL CONTENT MANAGEMENT SYSTEM AND ARTICLE OF MANUFACTURE THEREOF

(75) Inventors: Robert L. Davis, Los Angeles, CA (US); Benjamin J. Weinberger, Beaufort, SC (US)

(73) Assignees: DG Entertainment Media, Inc., Los Angeles, CA (US); Digitalsmiths Corporation, Durham, NC (US)

( * ) Notice: Subject to any disclaimer, the term of this patent is extended or adjusted under 35 U.S.C. 154(b) by 7 days.

(21) Appl. No.: 12/756,498

(22) Filed: Apr. 8, 2010

(65) Prior Publication Data

US 2010/0211877 A1    Aug. 19, 2010

Related U.S. Application Data

(60) Division of application No. 11/527,748, filed on Sep. 26, 2006, now Pat. No. 7,761,795, which is a continuation-in-part of application No. 10/443,546, filed on May 22, 2003, now abandoned.

(51) Int. Cl.
*G06F 3/00* (2006.01)
*H04N 5/445* (2011.01)
(52) U.S. Cl. .......... 715/723; 715/719; 715/765; 725/41; 725/42; 725/53
(58) Field of Classification Search .................. 715/716, 715/719, 723, 733, 764, 765, 835, 846, 205; 725/32, 34, 35, 37, 41, 42, 53; 705/14; 707/661, 707/705, 805
See application file for complete search history.

(56) References Cited

U.S. PATENT DOCUMENTS

| | | | |
|---|---|---|---|
| 5,099,319 A | 3/1992 | Esch et al. | 725/36 |
| 5,459,517 A | 10/1995 | Kunitake et al. | 375/240.13 |
| 5,537,528 A | 7/1996 | Takahashi et al. | 395/154 |
| 5,802,361 A | 9/1998 | Wang et al. | 382/217 |
| 6,134,380 A | 10/2000 | Kushizaki | 386/55 |
| 6,154,601 A | 11/2000 | Yaegashi et al. | 386/52 |
| 6,172,675 B1 | 1/2001 | Ahmad et al. | 345/328 |
| 6,192,183 B1 | 2/2001 | Taniguchi et al. | 386/52 |
| 6,195,458 B1 | 2/2001 | Warnick et al. | 382/173 |
| 6,249,280 B1 | 6/2001 | Garmon et al. | 345/328 |
| 6,285,361 B1 | 9/2001 | Brewer et al. | 345/328 |
| 6,292,620 B1 | 9/2001 | Ohmori et al. | 386/55 |
| 6,327,420 B1 | 12/2001 | Furukawa | 386/52 |
| 6,330,004 B1 | 12/2001 | Matsuzawa et al. | 345/723 |
| 6,449,608 B1 | 9/2002 | Morita et al. | 707/3 |
| 6,792,573 B1 | 9/2004 | Duncombe | 715/209 |

(Continued)

FOREIGN PATENT DOCUMENTS

WO    WO 0127810    4/2001

*Primary Examiner* — Xiomar L Bautista
(74) *Attorney, Agent, or Firm* — Joseph T. Guy; Nexsen Pruet, LLC

(57) ABSTRACT

A system for creating user defined advertisements. The system comprises a computer readable storage medium. The medium comprises a digitized film/video; an attribute database comprising predetermined attributes. Each attribute correlates to at least one scene of the film/video. An advertisement database is provided comprising predetermined advertisements of the film/video. A publication database is provided comprising critiques of the film/video. The medium also comprises selection instructions for the user to select, for viewing, one of the digitized film/video, the selected scene, the predetermined advertisements or the critiques. A machine capable of reading the computer readable storage medium implements the instructions for viewing.

4 Claims, 4 Drawing Sheets

U.S. PATENT DOCUMENTS

| | | | |
|---|---|---|---|
| 6,882,793 B1 | 4/2005 | Fu et al. | 386/95 |
| 6,956,573 B1 * | 10/2005 | Bergen et al. | 345/473 |
| 6,961,954 B1 | 11/2005 | Maybury et al. | 725/53 |
| 2002/0089646 A1 | 7/2002 | Chang | 352/131 |
| 2002/0108112 A1 | 8/2002 | Wallace et al. | 725/40 |
| 2002/0194195 A1 | 12/2002 | Fenton et al. | 707/104.1 |
| 2003/0122954 A1 | 7/2003 | Kassatly | 348/335 |
| 2004/0001160 A1 * | 1/2004 | Herley | 348/465 |
| 2004/0019524 A1 | 1/2004 | Marshall | 705/14 |
| 2007/0005795 A1 * | 1/2007 | Gonzalez | 709/232 |

* cited by examiner

INTERACTIVE PROMOTIONAL CONTENT MANAGEMENT SYSTEM AND ARTICLE OF MANUFACTURE THEREOF

CROSS-REFERENCE TO RELATED APPLICATIONS

This application is a divisional application of application Ser. No. 11/527,748 filed Sep. 26, 2006, now U.S. Pat. No. 7,761,795 which is, in turn, a continuation-in-part of U.S. patent application Ser. No. 10/443,546 filed May 22, 2003 now abandoned which is also pending.

BACKGROUND OF THE INVENTION

The present invention relates to an interactive promotional system wherein promotional materials can be created from previously prepared trailers, teasers, television and radio commercials, critical acclaim reports, print media advertisements and film/video clips matching particular attributes chosen by the user.

Pre-releases of certain film/video scenes are important to the success of the film/video upon release. It is therefore very common to prepare and distribute specific scenes or highlights (clips) to various media outlets prior to the release of a film/video. Select portions of a larger video and/or audio recording are termed "clips". It would be advantageous to provide promotional material specifically prepared for the local, or ancillary, target audience. This targeting could greatly enhance the effectiveness of the advertisement. Editing is a time consuming task thereby hampering efforts to create targeted promotional material. Particularly, it would be very difficult to prepare all of the various tailored promotional materials necessary for the many locations and diverse target audiences. This task is better suited for ancillary or local advertising groups. Local, or ancillary, advertising groups do not typically have the capability, or desire, to create tailored promotionals due to the time consumption and lack of resources.

Once a film/video has become popular certain scenes may again become valuable for advertisers seeking to sell merchandise. For example, it may be valuable to utilize a scene/clip, or spoken line, from a well-known film/video in advertisements of commercial goods. It is often difficult to obtain such scenes, or lines, efficiently due to the time consuming task of editing. Automatic editing is available yet this lacks the specificity necessary to select scenes based on embedded information such as location, props, actors or actresses, etc.

Editing methods are well known in the industry. Automatic editing is described in U.S. Pat. No. 6,195,458. Editing can be accomplished by utilization of a time stamp wherein the frames are sequenced to the time stamp such as described in U.S. Pat. No. 6,330,004. Editing by displaying images in hierarchical order is described in U.S. Pat. No. 6,327,420. Methods of manipulating the image are provided in U.S. Pat. No. 6,249,280. Other editing methods are described in, for example, U.S. Pat. Nos. 6,134,380; 6,154,601; 6,285,361 and 6,292,620. Creation of a database comprising scene information is described in U.S. Pat. Nos. 5,537,528 and 6,192,183. A method for correlating image, text and audio data is provided in U.S. Pat. No. 6,172,675.

While there are a myriad of editing techniques none of these provide a typical user with the ability to efficiently prepare promotional material tailored to a target audience.

There has been a long felt desire for a system capable of allowing a user to interactively prepare promotional material/clips efficiently.

BRIEF SUMMARY OF THE INVENTION

It is object of the present invention to provide a method for interactively preparing promotional materials from various forms of input including textual, audio and film/video.

It is another object of the present invention to provide a computer readable storage medium comprising stored instructions for a user to interactively prepare promotional materials/clips.

It is another object of the present invention to provide a system for creating an interactive user defined promotional for films/videos.

A particular feature is the simplicity with which various forms of information can be retrieved and correlated.

Another particular feature is the ability to extract specific scenes/clips from a film/video comprising specific attributes for merging into a promotional tailored to a target audience.

Another particular feature is the ability to specifically store select clips in a clip bin based on common attributes selected by the user.

These and other advantages, as would be realised to one of ordinary skill in the art, are provided in a system for creating user defined advertisements. The system comprises a computer readable storage medium. The medium comprises a digitized film/video and an attribute database comprising predetermined attributes. Each attribute correlates to at least one scene/clip of the film/video. An advertisement database is provided comprising predetermined advertisements/clips of the film/video wherein the predetermined clips each have a common attribute. A publicity database is provided comprising critiques of the film/video. The medium also comprises selection instructions for the user to select, for viewing and combining in a promotional, one of the digitized film/video, the selected scene, the predetermined advertisements or the critiques. A machine capable of reading the computer readable storage medium implements the instructions for viewing.

Another embodiment is provided in a method for providing a user directed advertising system for a film/video. The method comprises a) digitizing the film/video;
b) creating an attribute database correlating each attribute of a multiplicity of attributes with at least one scene/clip in the film/video;
c) creating an advertising database comprising predetermined advertisements/clips selectable by the user;
d) preparing a computer readable storage medium comprising the attribute database, the film/video, the advertising/clip database and stored instructions for selecting one of the attribute database, the film/video and the advertising/clip database for viewing a film/video segment comprising the attribute, the film/video or the predetermined advertisement/clip.

Yet another embodiment is provided in a computer readable storage medium comprising stored instructions for a user directed advertising/clip system for film/video. The stored instructions comprise: a user selection mechanism for selecting at least one of an edit database, a movie database and an advertising data base. The edit database comprises predetermined attributes selectable by the user. Each attribute of the attributes corresponds to at least one scene of the film/video comprising the attribute. Searching the film/video for the attribute creates a search result consisting of every scene with the attribute. The movie database comprises a script of the film/video and chapters of the film/video. The advertising database comprises predetermined prepared advertisements selectable by the user.

Yet another embodiment is provided in a system for creating a user defined clip comprising. The system has a computer readable storage medium with a digitized film/video; an attribute database wherein the attribute database comprises predetermined attributes and wherein each attribute of the predetermined attributes correlates to at least one scene of the film/video. A database comprises predetermined portions of said film/video correlated to the attribute. Selection instructions are provided instructing the user to select for viewing form one of the digitized film/video, a selected scene of the film/video comprising a selected attribute, the predetermined portion or the critiques. A machine is provided which is capable of reading the computer readable storage medium and implementing the instructions for the viewing and combining selections into an advertisement. A clip bin is provided wherein user selected clips are collected.

Yet another embodiment is provided in a method for providing a user directed advertising system for a film/video. The method includes: digitizing the film/video; creating an attribute database correlating each attribute of a multiplicity of attributes with at least one scene in the film/video; creating a first database comprising predetermined clips correlated to the attribute; preparing a computer readable storage medium comprising the attribute database, the film/video, the advertising database and stored instructions for selecting one of the attribute database, the film/video and the advertising database for viewing a film/video segment comprising the attribute, the film/video or the predetermined clip; providing a user addressable interface for selecting clips independent of the attribute wherein the clips are stored in a clip bin upon activation of the interface.

Yet another embodiment is provided in a system for creating a database. The system has a digitized film/video wherein clips of the film/video have associated therewith predetermined attributes. A user viewing system is provided wherein the user can separate clips with a common attribute from the film/video to form a target video. A clip bin is provided wherein the user can direct select clips to the clip bin.

DETAILED DESCRIPTION OF THE INVENTION

The inventors of the present application have developed, through diligent research, a system, and method, for creating a user defined advertisement and a computer readable storage medium comprising stored instructions for same.

The invention will be described with reference to the figures forming a part of the present application. In the various figures similar elements are numbered accordingly.

Figure 1:
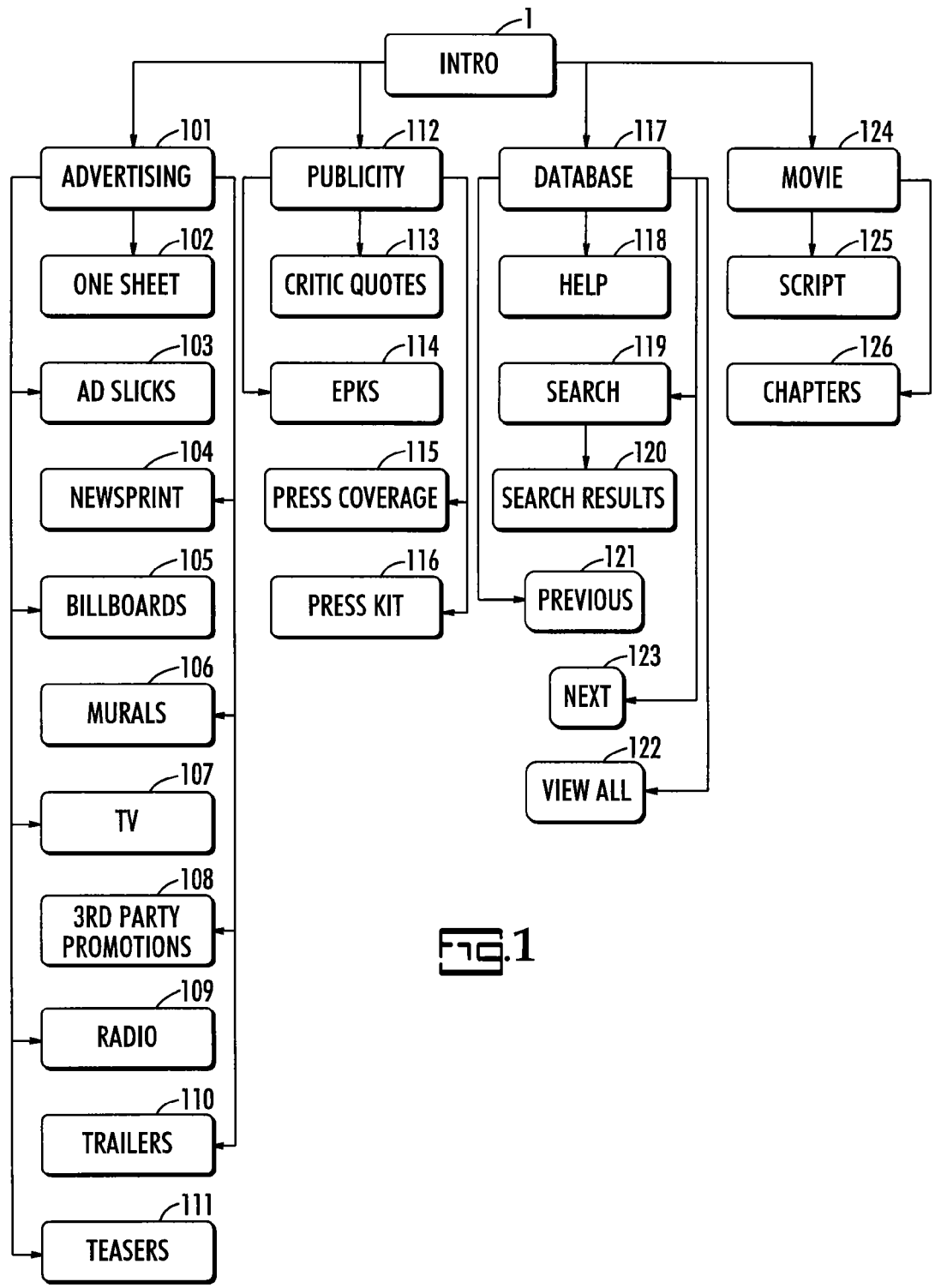
FIG. 1 is a flow chart representation of the data provided on a computer readable storage medium of the present invention.

A schematic representation of the information contained on the computer readable storage medium of the present invention is provided in FIG. 1. An introductory block, 1, provides an interface to the user. The user can access information through activation of user accessible icons. The user accessible icons are preferably integral to various screens displayed on a monitor as commonly employed with computer readable storage mediums.

Figure 2:
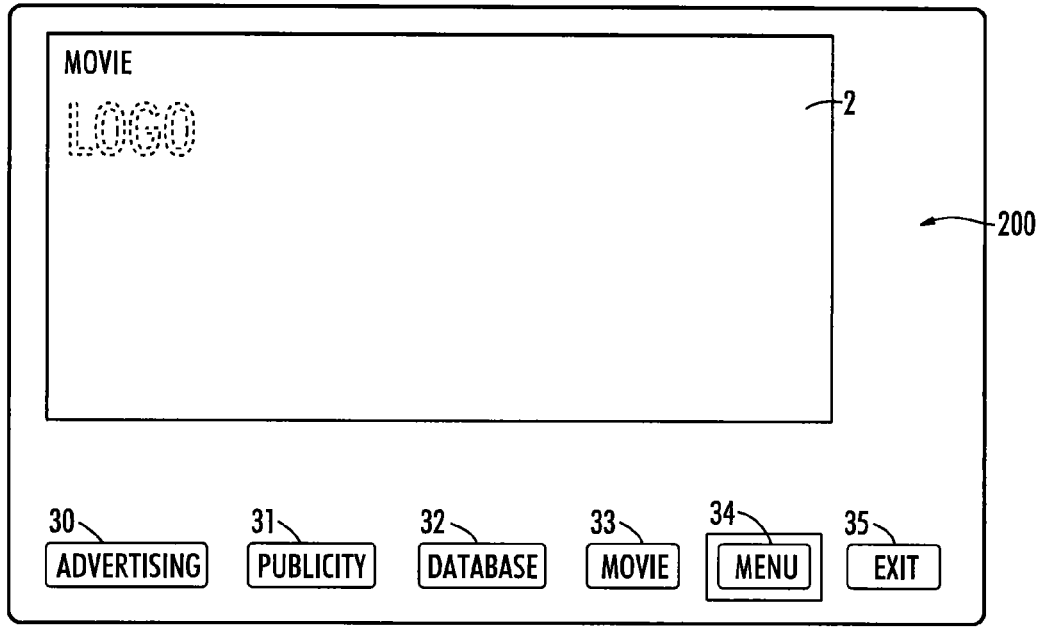
FIG. 2 provides a representation of a preferred screen image of an introduction screen of the present invention.
Figure 3:
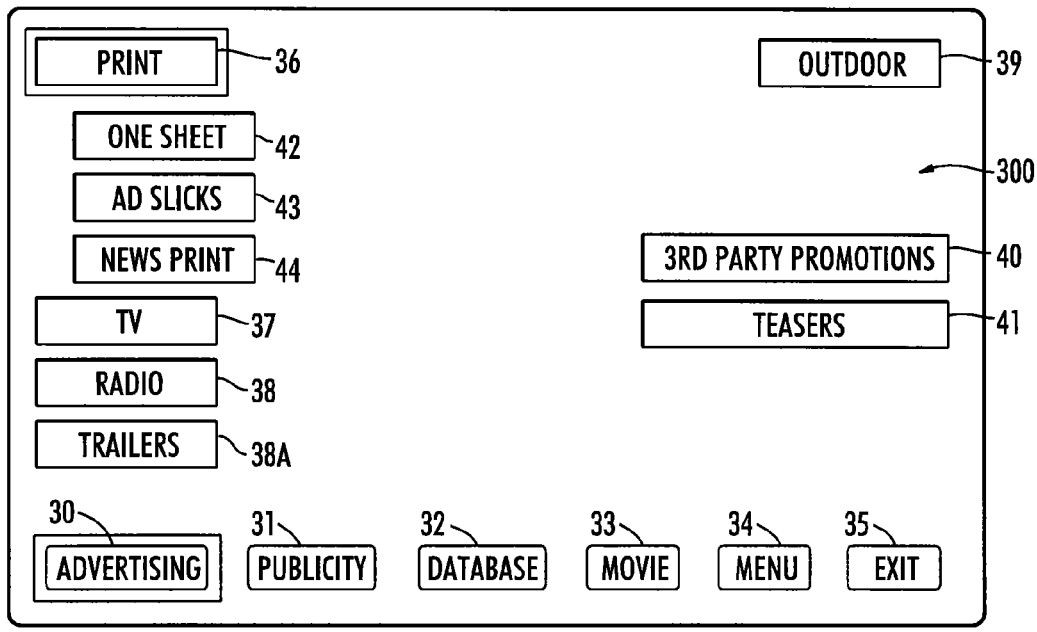
FIG. 3 provides a representation of a preferred screen image of an advertising screen of the present invention.
Figure 4:
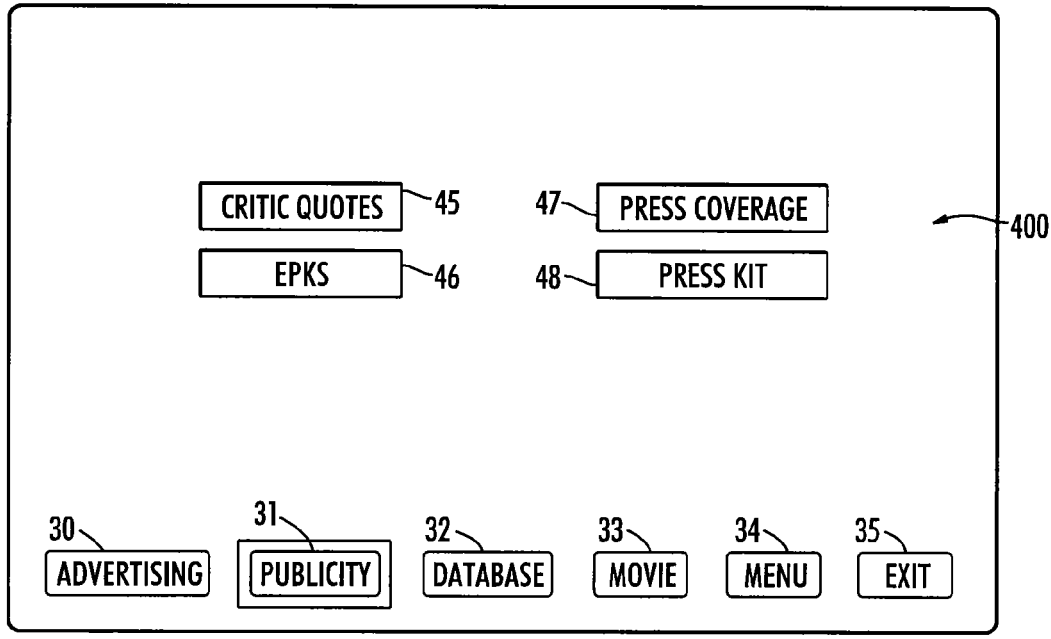
FIG. 4 provides a representation of a preferred screen image of a publicity screen of the present invention.
Figure 5:
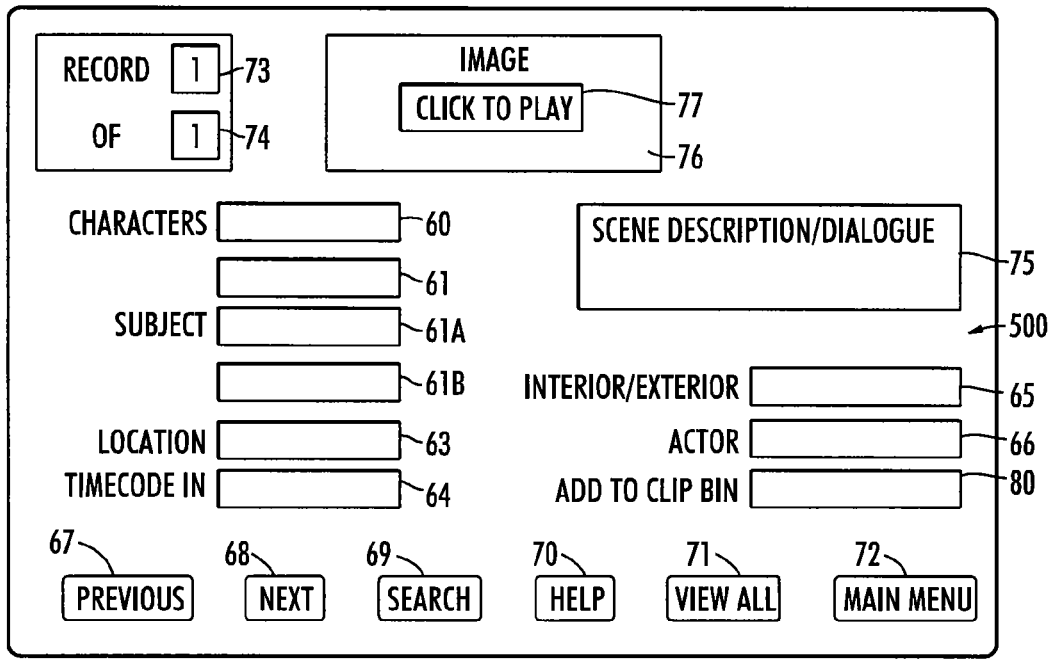
FIG. 5 provides a representation of a preferred screen image of a database screen of the present invention.
Figure 6:
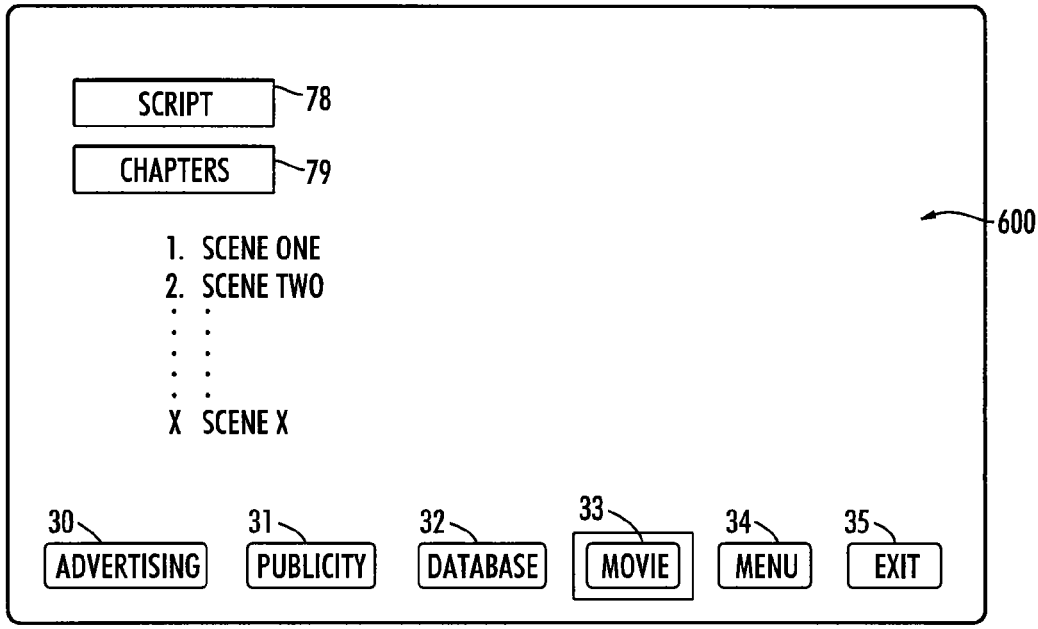
FIG. 6 provides a representation of a preferred screen image of a movie screen of the present invention.

The introduction screen, 200, illustrated in FIG. 2, preferably comprises a multiplicity of user addressable icons (30-35) and an illustrative panel, 2. User addressable icon, 34, is preferably highlighted indicating the screen image currently visible to the user. Activation of the user addressable icons direct the computer to display a different screen as will be further described herein. Illustrative panel, 2, preferably comprises a still scene from the film/video, a streaming film/video of at least a portion, scene or highlight of the film/video or a still image representation of the film/video. It is most preferred that the corresponding sound track be played in concert with the illustrative panel if appropriate. Each addressable icon, when activated by the user, instructs the computer to display a different predetermined screen. Addressable icon, 30, instructs the computer to display an advertising screen, 300, as illustrated in FIG. 3. Addressable icon, 31, instructs the computer to display a publicity screen, 400, as illustrated in FIG. 4. Addressable icon, 32, instructs the computer to display a database screen, 500, as illustrated in FIG. 5. Addressable icon, 33, instructs the computer to display a movie screen, 600, as illustrated in FIG. 6. Addressable icon, 34, instructs the computer to display the introduction screen, 200, as illustrated in FIG. 2. Addressable icon, 35, instructs the computer to exit the application.

Advertising data, 101, provides predetermined print, film/video and audio advertisements prepared for a variety of audiences. The advertising data will be described with reference to FIGS. 1 and 3. Advertising includes promotionals. Advertising media is preferably provided in seven formats correlating with the common advertising formats. Print media includes items suitable for various forms of printing such as those known in the art as one-sheet advertisements, 102, ad slicks, 103, and news print, 104. The print media is accessed by addressing the user addressable icon 36, as illustrated, thereby providing additional user addressable icons 42-44. By addressing the appropriate icon the user can view, print or store separately, the appropriate printed information for preparation of a tailored print promotional or for merging with other forms of advertisement available on the recorded medium. Previously prepared television commercials can be obtained by activating user addressable icon 37, at block 107. Radio commercials can be obtained by activating user addressable icon 38, at block 109. Film/video trailers can be obtained by activating user addressable icon 38a, at block 110. Outdoor advertisements, such as billboards, 105, and murals, 106, can be obtained by activating user addressable icon 39. Third party promotions can be obtained by activating user addressable icon 40, at block 108. Teasers can be obtained by activating user addressable icon 41, at block 111.

Publicity data comprises information generated by various parties such as critics, print media, etc. as well as information typically provided to these parties such as press kits, either physical or electronic. The publicity data, 112, is viewed by activating user accessible icon 31 from any screen comprising the icon. Publicity data will be discussed with reference to FIGS. 1 and 4. Publicity data, 112, includes critic quotes, electronic press kits, press releases, and press kits. Critic quotes, 113, are accessible by activating user addressable icon, 45. Electronic press kits (EPKs), 114, are accessible by activating user addressable icon, 46. Press releases or coverage, 115, are accessible by activating user addressable icon, 47. Press kits, 116, are accessible by activating user addressable icon, 48.

The database, 117, allows the user to extract specific scenes from the film/video based on selection criteria, or attributes, common with the various scenes. The database will be described with reference to FIGS. 1 and 5. The database screen, 500, is displayed in response to the user activating user addressable icon 32 wherever available. The database comprises a multiplicity of predetermined attributes wherein each attribute corresponds to specific scenes in the film/video. Each attribute is accessible in a pull down menu, 60-66 as well known in the art. A specific character can be input at character block 60 and a search initiated by activating user addressable icon, 69, at block 119. All scenes with the listed character, at box 120, would be extracted for viewing and use in a promotional if desired. The specific scene number would be identified in sequence box, 73. It is preferred that the sequence number be chronological. The total number of scenes meeting the attribute(s) entered would be indicated at scenes box 74. In a similar manner subject matter could be entered in subject box 61 or secondary subject matter could be entered in secondary subject boxes 61a and 61b. The location of the scene could be entered in location box, 63. Whether the scene is interior or exterior could be entered in interior/exterior box, 65, and the specific actor can be listed in the actor box, 66. A search can be activated with any combination of boxes containing attributes. Each scene extracted would preferably have all attributes chosen in that particular scene and would represent a search result, 120. Each scene extracted preferably contains a scene description and dialogue at scene box, 75, and a timecode at time box 64. The user can scroll through the scenes to view the previous scene in sequence by activating user addressable icon, 67, at 121, or the next screen in sequence by activating user addressable icon, 68, at 123. A help menu is provided by activation of user addressable icon, 70, at box 118. All scenes can be depicted by activating a user addressable icon, 71, indicated at 122. The main menu is accessed by activating user addressable icon 72. Each scene can be played in image area, 76, by activation of user addressable icon 77.

If desired individual clips can be stored in a clip bin by activation of user addressable icon 80 of FIG. 5. The clip bin is an individual file containing clips chosen by the user. The clip bin may contain sub-bins wherein each sub-bin may be allocated to a specific attribute, user, group of users, type or combinations thereof. As a non-limiting example, a user searching for a particular city scene may create a clip bin file for collecting those scenes of interest. As images of that city are recognized the user may extract the clip and insert it in the clip bin or sub-bin dedicated to scenes of that city. Similarly, bins dedicated to actors, props, topics, or any visual or audio clip of interest to the user may be compiled in a separate clip bin or sub-bin. In a particular preferred embodiment the clip bin may be allocated to individual users or groups of users. After searching the user can view the clip bin contents, print the clip bin contents or export the contents to an edit decision list in a format of choice.

The movie screen, 600, is displayed in response to activation of user addressable icon 33. The movie data will be described with reference to FIGS. 1 and 6. The script can be reviewed by activation of user addressable icon 78, at box 125. Alternatively, the chapters can be accessed by activation of user addressable icon 79. The script for each chapter, or scene, can by accessed, at box 126, directly by activating the appropriate chapter title preferably displayed in the form of a user accessible icon.

Figure 7:
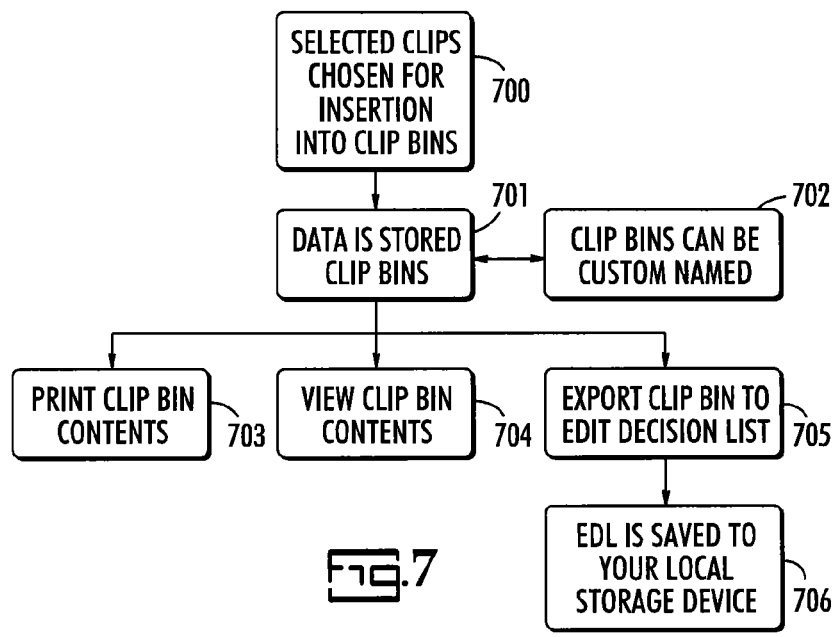
FIG. 7 illustrates an embodiment of the present invention wherein select clips are stored in a clip bin.

An embodiment of the present invention will be described with reference to FIG. 7. In FIG. 7 the selected clips are chosen for insertion into the clip bins at 700, by activation of the user addressable icon 80 of FIG. 5. The data representing the selected clip is stored in a clip bin at 701. The clip bin can be custom named at 702 and user attributes or access limitations may be placed on the clip bin. The data contained in the clip bin may be printed at 703, viewed at 704 or exported at 705. The exported file may be saved at a local storage device, 706.

The use and activation of user addressable icons is well known in the art. The present invention can be implemented with any method allowing the user to select an icon and engage the icon to select a task. Included, but not limited thereto, are manipulations by a mouse, touch screens wherein a region of the screen is touched with a finger, stylus or other object and radiation based pointers such as laser pointers and the like.

The present invention may be conveniently implemented using conventional general purpose digital computers programmed according to the teachings of the specification. Appropriate software can be readily prepared by one of ordinary skill in the art of computer programming based on the descriptions and figures contained herein. Conventional software, such as FILEMAKER PRO5™ is suitable for demonstration of the present invention. Combining selected images, still or moving, with text or audio from the data may be easily accomplished by any technique known in the art and generally referred to as cut-and-paste or click-and-drag technology utilizing a mouse, pointer or similar device. Each selected element is encompassed in an edit list which is combined in the order and format chosen by the user.

The computer readable storage medium may include, but is not limited to, any type of conventional floppy discs, optical discs, CD-ROMs, magneto-optical discs, ROMs, RAMs, EPROMs, EEPROMs, magnetic or optical cards, or any other suitable media for storing electronic instructions.

The present invention is specifically described or use with film/video containing correlated audio information. It is most preferred that all instances of film/video include the audio sound track played in correlated fashion as would be typical of a film/video. It is understood that the present invention can be employed with or without film/video and audio being coordinated.

The invention has been described with particular emphasis on the preferred embodiments. It would be realized from the teachings herein that other embodiments, alterations, and configurations could be employed without departing from the scope of the invention which is more specifically set forth in the claims which are appended hereto.

The invention claimed is:

1. A method for providing a user directed advertising system for a film/video wherein said method comprises:
   digitizing said film/video;
   creating an attribute database correlating each attribute of a multiplicity of attributes with at least one scene in said film/video;
   creating a first database comprising predetermined clips correlated to said attribute;

preparing a computer readable storage medium comprising said attribute database, said film/video, said advertising database and stored instructions for selecting one of said attribute database, said film/video and said advertising database for viewing a film/video segment comprising said attribute, said film/video or said predetermined clip;

providing a user addressable interface for selecting clips independent of said attribute wherein said clips are stored in a clip bin upon activation of said interface.

2. The method for providing a user directed advertising system of claim 1 further comprising a least one of a viewer for viewing said clip bin contents, a printer for printing said clip bin contents and an exporter for exporting said clip bin contents to a second device.

3. A system for creating a database comprising:
a digitized film/video wherein clips of said film/video have associated therewith predetermined attributes;
a user viewing system wherein said user can separate clips with a common attribute from said film/video to form a target video;
a clip bin wherein said user can direct select clips to said clip bin.

4. The system of claim 3 wherein said clip bin can be viewed, printed or exported.

* * * * *